United States Patent [19]

Kronschnabel et al.

[11] Patent Number: 4,502,642

[45] Date of Patent: Mar. 5, 1985

[54] PROCESS FOR THE SEPARATION OF COATED NUCLEAR FUEL PARTICLES FROM A GRAPHITIC MATRIX AND INSTALLATION FOR IMPLEMENTING THE PROCESS

[75] Inventors: Hartmut Kronschnabel, Aachen; Wilhelm Goerings, Jülich; Johann Bölingen, Aachen; Gerd Kleine-Vennekate, Haan/Gruiten, all of Fed. Rep. of Germany

[73] Assignee: Kernforschungsanlage Jülich GmbH, Jülich, Fed. Rep. of Germany

[21] Appl. No.: 343,703

[22] Filed: Jan. 28, 1982

[30] Foreign Application Priority Data

Feb. 5, 1981 [DE] Fed. Rep. of Germany ....... 3103900

[51] Int. Cl.³ .............................................. B02C 19/12
[52] U.S. Cl. ............................. 241/79.1; 241/152 A; 241/189 R; 241/282; 423/20
[58] Field of Search ............... 423/4, 20; 241/79, 227, 241/264–269, 235, 236, 222, 101.2, 79.3, 280, 282, 277, 189 R, 65, 152 A, 79.1

[56] References Cited

U.S. PATENT DOCUMENTS

| 3,112,851 | 12/1963 | Collins | 241/65 X |
| 3,145,078 | 8/1964 | Strickland et al. | 423/4 |
| 3,285,692 | 11/1966 | Robertson | 241/189 X |
| 3,346,197 | 10/1967 | Sagar | 241/235 X |
| 4,345,720 | 8/1982 | Takacs et al. | 241/79.3 X |

FOREIGN PATENT DOCUMENTS 1097597 1/1968 United Kingdom ............. 423/4

OTHER PUBLICATIONS

Gulf-GA-A 10 784, 12-1971.

*Primary Examiner*—Mark Rosenbaum
*Attorney, Agent, or Firm*—Scully, Scott, Murphy & Presser

[57] ABSTRACT

A treating process is provided for the separation of coated nuclear fuel particles from a graphitic matrix in which the nuclear fuel particles are embedded, and an installation provides for the conditioning of graphitic fuel elements of high-temperature nuclear reactors. The graphite which encompasses the nuclear fuel particles is conducted away through the action of a brush which isolates the nuclear fuel particles together with their coatings or the nuclear particles themselves. The nuclear fuel particles which are contained in the brushed product are then separated from the comminuted graphite.

14 Claims, 3 Drawing Figures

PROCESS FOR THE SEPARATION OF COATED NUCLEAR FUEL PARTICLES FROM A GRAPHITIC MATRIX AND INSTALLATION FOR IMPLEMENTING THE PROCESS

BACKGROUND OF THE INVENTION

1. Field of the Invention

The present invention relates to a treating process for the separation of coated nuclear fuel particles from a graphitic matrix in which the nuclear fuel particles are embedded, as well as to an installation for the conditioning of graphitic fuel elements of high-temperature nuclear reactors.

Nuclear fuel particles are worked out of a graphitic matrix during the reconditioning of spent fuel elements of high-temperature nuclear reactors for the reconditioning of the nuclear fuels. For this purpose, there is required a breaking open of the fuel elements with the subsequent separation of the exposed nuclear fuel particles which contain the nuclear fuels, prior to the particles being chemically dissolved and cleaned. For graphitic fuel elements there must be taken special care that the graphite, which constitutes about 90 to 95% of the quantity of the fuel element, must be removed and the coated nuclear fuel particles which are embedded in the graphitic matrix are isolated. The comminuting of the fuel elements, the separation of the nuclear fuel fraction and graphite fraction, the removal of the graphite mass and a chemical dissolution of the nuclear fuel particles are consequently the process steps which characterize the initial stage of a reconditioning installation for fuel elements. The initial stage is designated as the "head-end" of a reconditioning installation.

2. Discussion of the Prior Art

During the breaking open of the graphitic fuel elements there is aimed at conducting the comminuting step so that subsequently thereafter there becomes possible an extensive quantitative separation between graphite and nuclear fuel particles. The utilization of known comminuting aggregates, such as a hammer mill, jaw crusher, and roll crusher, does, however, deliver an extremely heterogeneous ground product from which only about 60 to 70% of the ground material can be sifted off as nuclear fuel-free graphite; referring to the report GULF-GA-A 10 784,1971. Upon the exposure of the graphitic matrix with the integrated nuclear fuel particles in roll crushers, during the subsequent sifting of the ground product, transmitted in an undesired manner are also fragments of the nuclear fuel particles within the separated graphite fraction, which further reduces the economics of the already extremely complex reconditioning process.

The effectuation of a controlled comminuting step in which the graphite is essentially destroyed, and wherein the coated nuclear fuel particles, insofar as they include hard coatings, such as, for example, silicon carbide (SiC) shells, or the nuclear fuel particles themselves are to remain substantially preserved, is also a goal for a head-end stage in which the graphite is burned in a high-frequency vortex furnace, before the nuclear fuel particles are chemically dissolved. However, independently thereof, that during such process step, besides the emission of volatile fission products into the environment, there are encountered additional problems due to the therewith connected emission of radioactive carbon (carbon isotope C-14), through the employment of jaw crushers and subsequently used roll crushers, there is also only produced a ground product which consists of up to 87% of intact nuclear fuel particles, up to 5% of fragments of nuclear fuel particles, and up to 8% of nuclear fuel particles which are still coated with SiC; refer to H. M. Müller, "Head-End Processes for HTGRBE", NUKEM-160, 1973.

SUMMARY OF THE INVENTION

Accordingly, it is an object of the present invention to provide a novel treating process for the breaking open of the fuel elements and the separation of the nuclear fuel particles, wherein the nuclear fuel particles are removable undestroyed from the graphitic matrix and are separable from the graphite.

The foregoing object is achieved pursuant a process according to the above-mentioned type and in accordance with the invention wherein the graphite which encompasses the nuclear fuel particles is conducted away through the action of a brush which isolates the nuclear fuel particles together with their coatings or the nuclear particles themselves, and wherein the nuclear fuel particles which are contained in the brushed product are then separated from the comminuted graphite.

The nuclear fuel particles are worked out of the graphitic matrix through the action of a brush whose bristles conduct away the graphite, however, in which the coated nuclear fuel particles insofar as they contain, for example, hard coatings such as SiC shells, or the nuclear fuel particles themselves, remain preserved. Proven as being suitable therefor has been, for instance, a brush with bristles formed of steel. In accordance with the particular requirements, other materials come also into consideration for the bristles as long as during their application the surface of the nuclear fuel particles are not excessively worn off. The worked out nuclear fuel particles allow themselves to be separated in a simple manner from the comminuted graphite fraction, for example, through the delivery of the brushed product into a sifter which is passed through by a separating gas, in which the fine-grained fraction is conveyed away together with the gas stream.

In a further embodiment of the inventive working process, the nuclear fuel particles which are isolated during sifting are exposed in a crusher and/or in a mill. Depending upon conditions, the graphite residues which have not yet been conveyed away during brushing and in which there are still contained nuclear fuel particles, are concurrently conveyed into the crusher and/or the mill. After the sifting of the ground product, the fragments of the nuclear fuel particles are chemically dissolved, the separated graphite masses conditioned and stored.

Preferably, the inventive process is utilized in an installation for the preparation of the graphitic fuel elements of high-temperature nuclear reactors in a head-end stage of a reconditioning installation. The installation includes a brush device with a rotatably driven brush and pressure device for the fuel elements to be reconditioned which is arranged so as be movable against the bristles of the brush, in which the nuclear fuel particles are embedded in a graphitic matrix. The bristles of the brush are hereby so constructed that during rotation of the brush, the graphite which encompasses the nuclear fuel particles is worn off without damaging, or at most only slightly damaging the coated nuclear fuel particles, insofar as they evidence SiC shells, or the nuclear fuel particles themselves. Preferred is a brush having bristles constituted of steel. During the rotation of the brush, the steel bristles disintegrate the graphite and work the nuclear fuel particles, whose surface is harder than the graphite, out of the graphitic matrix. The coated nuclear fuel particles are hereby not exposed to either a sudden striking or impact effect or to a high pressure load, as in crushers or mills. In an advantageous manner, also for SiC coated nuclear fuel particles the hull or shell fracture rate remains low. At the outlet end of the brush arrangement there is connected a pneumatic aspirating arrangement for the brushed product.

In order to maintain the graphite quantity which is to be worked out in the brush device as low as possible during the reconditioning of fuel elements, the installation includes a device located ahead of the brush installation for the conducting away of the outer, nuclear fuel-free graphite regions of the fuel elements. Connected downstream of the brush device is a sifter by means which the nuclear fuel particles are separated from the comminuted graphite in a separating gas stream; as well as a jaw crusher and/or a roll crusher for the exposure of the nuclear fuel particles. Leading to the jaw crusher and/or to the roll crusher is also a transport conduit for the graphite residues which have not been carried away during the brushing step, and which contain nuclear fuel particles. Following the above-mentioned aggregate of comminuting sequences is again a sifting of the ground product. The thusly recovered nuclear fuel particle fraction is thereafter conducted to a chemical solution, the separated graphite mass together with the remaining previously separated graphite is conditioned and stored.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
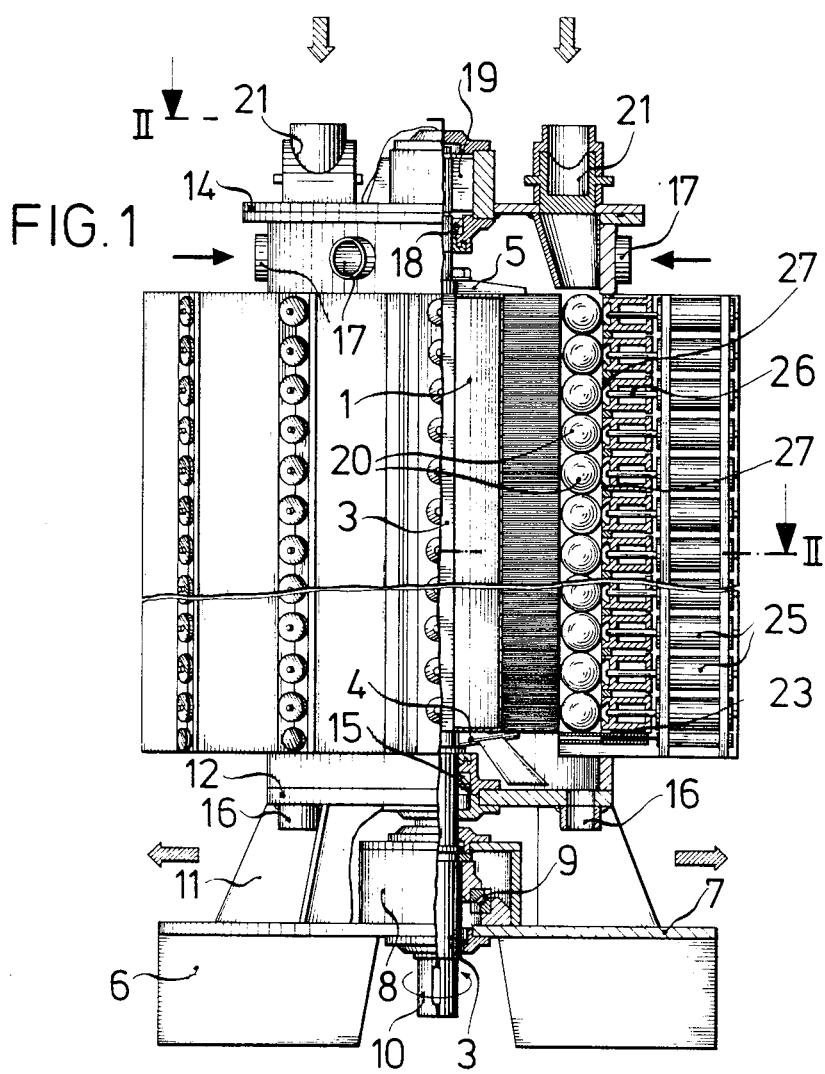
FIG. 1 illustrates a longitudinal sectional view through a brush device taken along line I—I in FIG. 2.
Figure 2:
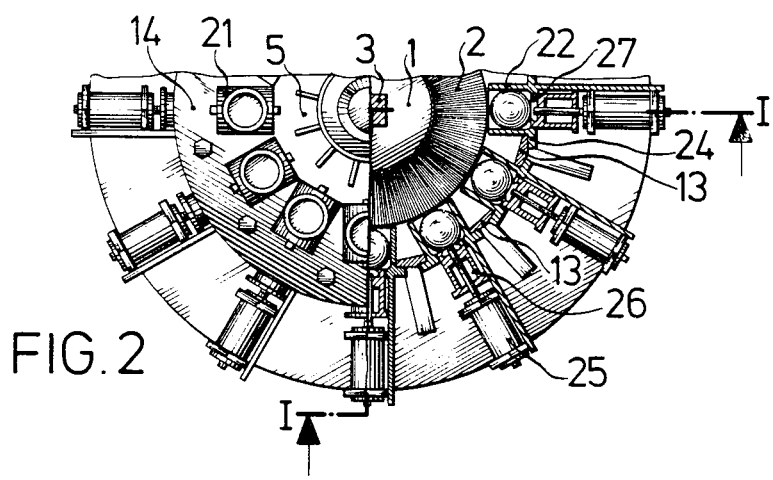
FIG. 2 is a cross-section through the brush device of FIG. 1 taken along line II—II.

Illustrated in FIGS. 1 and 2 is a brush device for the separation of nuclear fuel particles from graphitic fuel elements. The brush device includes a rotatably driven brush 1 with bristles 2, which is supported on a vertically arranged drive shaft 3. For the formation of the brush 1, employed in the exemplary embodiment are a plurality of commercially common circular brushes with steel bristles. As can be ascertained from FIG. 1, the brush 1 lies on a support plate 4 which is frictionally locked together with the drive shaft 3, and is clamped against the support plate 4 through the intermediary of a pressure plate 5 acting on its opposite end surface.

On a stand 6 for the brush device with a base plate 7 there is seated a lower bearing housing 8 of a support bearing 9 for the drive shaft 3. In the illustrated exemplary embodiment, the support bearing 9 is designed as an axial self-aligning roller bearing. The drive shaft 3 extends through the support bearing 9 and, at its lower shaft end 10, is connectable with a drive (not shown).

Figure 3:
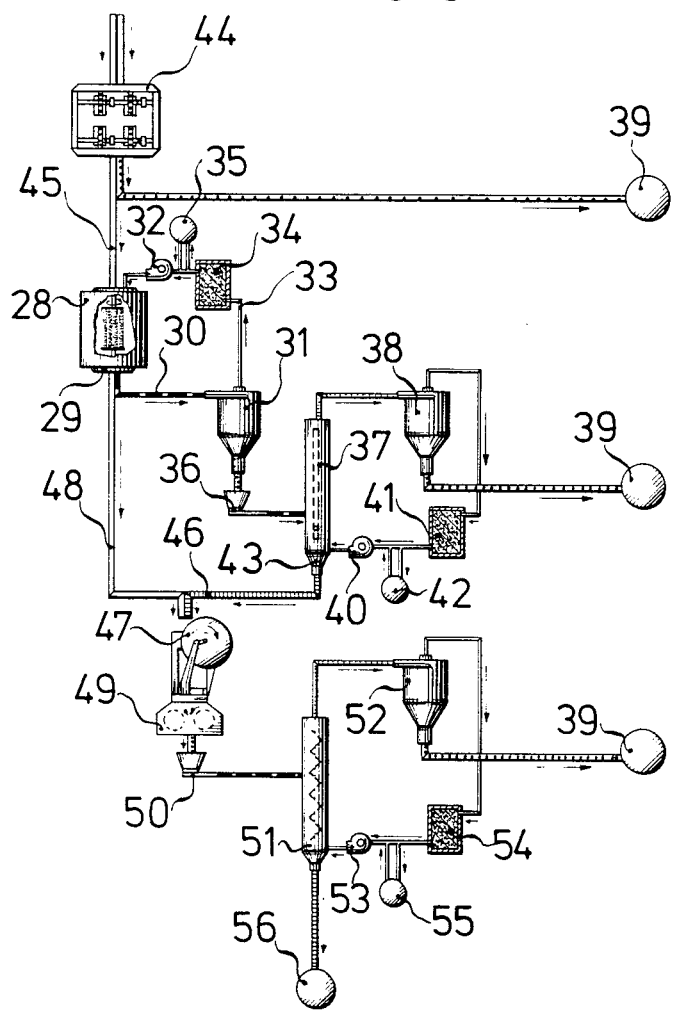
FIG. 3 is a schematic flow diagram of an installation for the preparation of the graphitic fuel elements of high-temperature nuclear reactors.

Fastened on a plurality of support ribs 11 on the base plate 7 is a housing of the brush device which consists of a base plate 12, housing shell 13 and housing cover 14. At the through passage of the drive shaft 3, the housing is sealed through sealing elements 15. Located in the base plate 12 are outlet apertures 16 for the dropping brushed material Connectable to the outlet apertures are the suction conduits of a pneumatic suction device which is schematically illustrated in FIG. 3, which will conduct the poorly flowable brushed material out of the brush device. The transport gas which is required for the pneumatic conveyance of the brushed material is conducted in a closed circuit by means of the suction device and, after the separation of the brushed material which has been removed from the brush device, is again conducted through an opening 17 in the housing shell 13 into the interior of the house of the brush device.

The housing cover 14 is flanged onto the housing shell 13 and can be unscrewed for effecting a brush change. The housing cover 14 also receives an upper radial bearing 18 for the drive shaft 3 with sealing elements 19. For the introduction of fuel elements 20 which are to be treated by the brush device, the housing cover 14 includes locks 21. Fuel elements which in the exemplary embodiment are fuel element spheres, drop from the lock 21 into chutes 22, which are arranged vertically ahead of the bristles 2 of the brush and are open facing towards the bristles. The chutes 22 are arranged dust-tight on the housing shell 13 between the base plate 12 and the housing cover 14, and are closable at the side of the brush facing towards the support plate 4 be means of radial sliders 23 which, in the exemplary embodiment are electromechanically adjustable. The open cross-section of the chutes 22 is so dimensioned that sufficient space stands available for the introduction of the fuel elements 20.

At each chute 22, respectively fastened on an externally directed rear wall 24 of the chute, there is located a pressure device for the fuel elements, by means of which the fuel elements press against the bristles of the brush 1 during the operation of the brush device. In the illustrated embodiment, the pressure device includes a plurality of hydraulic cylinders 25, from which pressing rams 26 are radially displaceable and which retain the fuel elements immobile during rotation of the brush 1. For this purpose, restraints 27 are applied at the ends of the pressing rams 26, by means of which the fuel element are centered and secured against rotation. Suitable as a restraint is, for instance, an apertured plate which is fastened to the pressing rams. In order to prevent any contact between the bristles of the brush and the apertured plates after the working down of the fuel elements, the pressure device includes stops (not shown). The pressing rams 26 are guided within the rear wall 24 of the chutes 22 in such a manner and sealed whereby, in general, there is produced a work zone which is dust-tight with respect to the exterior.

The brush device which is represented in the figures of the drawing is suited to expose 130 fuel element spheres in one operation. The outer diameter of the brush 1 measures 30 cm, its length in the axial direction 60 cm. The brush device includes 12 chutes 22 distributed about the circumference of the brush for introduction of the fuel element spheres.

When the brush device is charged with fuel elements then, subsequent to actuation of the brush drive, the fuel elements are pressed by the pressure device against the bristles of the brush 1. Thereby the compressive pressure in the hydraulic cylinders 25 is so regulated that the bristles will gradually conduct off the graphite of the fuel elements. The bristles, insofar as this relates to fuel particles which are coated with hard coatings such as, for example, nuclear fuel particles with SiC shells, are so deflected along the coating or along the surface of the nuclear fuel particles themselves, so that the nuclear fuel particles are exposed by and by until they drop out of their graphitic embeddment. At the end of each operation minute graphite residues remain in the restraints of the pressure device, in the illustrated embodiment, within the apertured plates these are spherical cups of about 5 to 7 grams in weight.

After unloading of the hydraulic cylinders, the pressing rams 26 are again brought into their initial position, the drive of the brush switched off, and the sliders 23 opened for emptying the brushed material. The brushed material with the spherical caps is pneumatically conveyed away.

In the conditioning of fuel element spheres which contain SiC-coated nuclear fuel particles, the brushed material consists of exposed coated nuclear fuel particles, as well as of a fine graphite dust with grain sizes of less than 63 μm. The grain sizes of the nuclear fuel particles fraction, pursuant to the nuclear fuel particles which are embedded in the fuel element spheres, are each between 500 to 1200 μm. This size difference between the graphite dust and the nuclear fuel particles fraction significantly renders easier the subsequent separation step. Also for nuclear fuel particles without SiC coating which are embedded in a graphitic matrix, for example for thorium oxide ($ThO_2$) particles, the nuclear fuel particles are worked out without substantial wear from the graphitic matrix through the bristles. The steel bristles are deflected along the $ThO_2$ surface of the nuclear fuel particles so that the nuclear fuel particles, freed from the graphite, can be separated whole from the brushed material. An installation for the processing of fuel elements for high-temperature nuclear reactors is represented in FIG. 3. FIG. 3 illustrates a schematic flow diagram of the installation.

The above-described brush device as illustrated in FIGS. 1 and 2, in the exemplary embodiment forms the second processing stage of the installation and in FIG. 3 is identified by reference numeral 28. From the discharge 29 of the brush device the poorly flowable brushed material is pneumatically conveyed within a transport conduit 30 into a cyclone 31 which again separates the brushed material from the conveying gas. The conveying gas is aspirated out of the cyclone by a blower 32 through a gas conduit 33 and then through a fine dust filter 34 and, in accordance with need, can also be subjected to a separating gas cleaning 35. The brushed material sinks downwardly in the cyclone 31 and flows in a conveying trough 36 into a vertically arranged sifter 37 which is traversed from below upwardly by separating gas. In the sifter 37 the fine graphite dust is carried out by the separating gas, separated in a cyclone 38 from the separating gas and conveyed to graphite consolidation unit 39. A blower 40 aspirates the separating gas from the cyclone 38 and conveys it through a fine dust filter 41 in a closed circuit. In accordance with requirements, the separating gas can also be subjected to a separating gas cleaning 42. The nuclear fuel particles which are separated in the sifter 37 collect themselves at the lower discharge 43 of the sifter.

The brush device 28 is connected downstream of an arrangement 44 which serves for the removal of external, nuclear fuel particle-free graphite regions of the fuel elements. During the removal of these graphite regions there is concurrently roughened the surface of the fuel elements. This facilitates the retention of the fuel elements in the brush device at a rotating brush through intermediary of the restraint 27 of the pressure device. The graphite which is conveyed away in the arrangement 44 is conducted to the graphite consolidation unit 39. The worked down fuel elements are conveyed through a transport conduit 45 to the brush device 28.

From the lower discharge 43 of the sifter 37 the separated nuclear fuel particles are conducted by a conveyor 46 to a jaw crusher 47. Together with the graphite residues which are drawn off from the brush device 29 through a transport conduit 48 which, in the exemplary embodiment, are separated out as spherical caps in the restraints 27 of the pressure device and remain unprocessed at the end of the brushing step and are sifted off from the brushed material, the nuclear fuel particles are exposed in the jaw crusher 47, as well as in a subsequent roll crusher 49. From the roll crusher the ground material is introduced by means of a conveyor trough 50 into a vertically arranged, so called "zig-zag" sifter 51 and separated in a downwardly sinking nuclear fuel fraction and a fine material fraction which is carried along upwardly by the separating gas. The fine material is again separated off in a cyclone 52 and conveyed to the graphite consolidation unit 39. The separating gas is aspirated from the cyclone 52 by a blower 53 and cleaned in a fine dust filter 54. Pursuant to requirements, the separating gas can be also subjected to a separating gas cleaning 55. The nuclear fuel fraction is conveyed from the bottom of the zig-zag sifter 51 to the processing stage for heavy metal 56.

Within the installation, the graphitic fuel elements are mechanically dry processed in three operating steps, and separated into a heavy metal-free graphite fraction which is stored, and in an extensively graphite-free nuclear fuel material fraction which is directly conveyable into the chemical solution. About 95% of the matrix graphite of the fuel elements, as well as the highly active coating shells of the nuclear fuel particles can be separated in sifters, subsequently conditioned and compactly stored. The closed transport and separating gas circuits of the installation require no special exhaust gas cleaning since a release of fission products, as would be caused during known processes as a result of thermal diffusion or oxidation, is considerably reduced. A separating gas cleaning, for example, can thereby also be coupled with the exhaust gas cleaning of the solvent of the reconditioning intallation. Since all process steps can be effectuated at room temperature and under atmospheric pressure, there is also rendered easier the technology of the safety design for the head-end stage.

With respect to the quality and configuration of the bristles for the brush which are to be selected, of particular significance are the hardness of the bristle material, the elasticity thereof and deformability, as well as the stiffness of the bristles in dependence upon the circumferential and rotational speed of the brush.

What is claimed is:

1. Installation for the treatment of graphitic fuel elements for high-temperature nuclear reactors, including fuel elements having nuclear fuel particles embedded in a graphitic matrix; comprising means for comminuting the fuel elements, and separating means for the comminuted fuel element material connected with the discharge of said comminuting means; brush means including a rotatably driven brush having bristles thereon and pressure means for said fuel elements movable towards the bristles of said brush, said pressure means including restraint means for securing the fuel elements against rotation, the bristles gradually removing the graphite encompassing the nuclear fuel particles and isolating the nuclear fuel particles with their coating or the nuclear fuel particles themselves.

2. Installation as claimed in claim 1, said brush including bristles formed of steel.

3. Installation as claimed in claim 1 or 2, comprising discharge openings for receiving the incident brushed fuel element material; and pneumatic suction means being connected to said openings for aspirating said material.

4. Installation as claimed in claim 1, said brush being vertically arranged.

5. Installation as claimed in claim 1, comprising chutes for introducing said fuel elements being positioned at the outer circumference of said brush ahead of the bristles of the brush.

6. Installation as claimed in claim 1, comprising means for removing the external, nuclear fuel-free graphite regions of the fuel elements being arranged ahead of said brush means.

7. Installation as claimed in claim 1, comprising a sifter for separating the brushed material being arranged downstream of said brush means.

8. Installation as claimed in claim 7, comprising crushing means for said separated nuclear fuel particles; and conveyor means for transporting said particles from the discharge of said sifter to said crushing means.

9. Installation as claimed in claim 8, comprising a conveying conduit for transporting graphite residues containing nuclear fuel particles not removed during brushing to said crushing means.

10. Installation as claimed in claim 8 or 9, comprising a zig-zag sifter for the ground fuel element material being connected to the discharge of said crushing means.

11. Installation as claimed in claim 10, comprising a treating stage for heavy metal being connected to the discharge of said zig-zag sifter for the nuclear fuel fraction recovered therein.

12. Installation as claimed in claim 8, said crushing means comprising jaw crushers.

13. Installation as claimed in claim 8, said crushing means comprising roll crushers.

14. Installation as claimed in claim 1, comprising graphite conditioning means for conditioning the separated graphite.

* * * * *